United States Patent
Savage

[19]

[11] Patent Number: 5,884,648
[45] Date of Patent: Mar. 23, 1999

[54] COUPLING VALVE APPARATUS AND METHOD

[75] Inventor: Chester Savage, Irvine, Calif.

[73] Assignee: Scholle Corporation, Irvine, Calif.

[21] Appl. No.: 920,137

[22] Filed: Aug. 27, 1997

[51] Int. Cl.[6] .................................................. F16L 37/28
[52] U.S. Cl. .................... 137/1; 137/614.01; 137/614.04
[58] Field of Search ........................ 137/614.04, 614.01, 137/614.02, 614.05, 614, 1

[56] References Cited

U.S. PATENT DOCUMENTS

| | | |
|---|---|---|
| H1226 | 9/1993 | VanReenen et al. . |
| 2,073,048 | 3/1937 | Clark . |
| 4,421,146 | 12/1983 | Bond et al. . |
| 4,696,326 | 9/1987 | Sturgis . |
| 4,942,901 | 7/1990 | Vescovini . |
| 4,948,014 | 8/1990 | Rutter et al. . |
| 5,004,013 | 4/1991 | Beaston . |
| 5,031,662 | 7/1991 | Roethel . |
| 5,255,713 | 10/1993 | Scholle et al. ...................... 137/614.04 |
| 5,316,041 | 5/1994 | Ramacier, Jr. et al. . |
| 5,353,836 | 10/1994 | DeCler et al. ...................... 137/614.05 |
| 5,609,195 | 3/1997 | Stricklin et al. ............... 137/614.04 X |

FOREIGN PATENT DOCUMENTS 0294095  12/1988  European Pat. Off. .

*Primary Examiner*—Kevin Lee
*Attorney, Agent, or Firm*—Oppenheimer Wolff & Donnelly LLP

[57] ABSTRACT

A two-part coupling valve apparatus includes a first coupling part and a second coupling part which are mutually interengageable to open fluid communication through the coupling valve. The coupling parts can be disengaged from one another to discontinue fluid communication, which also closes fluid communication between each of the coupling parts and ambient. The retention volume of fluid exposed to ambient upon the coupling parts being disconnected is small. The coupling valve also allows a user to selectively regulate the flow rate of fluid by manually rotating the coupling parts relative to one another.

25 Claims, 4 Drawing Sheets

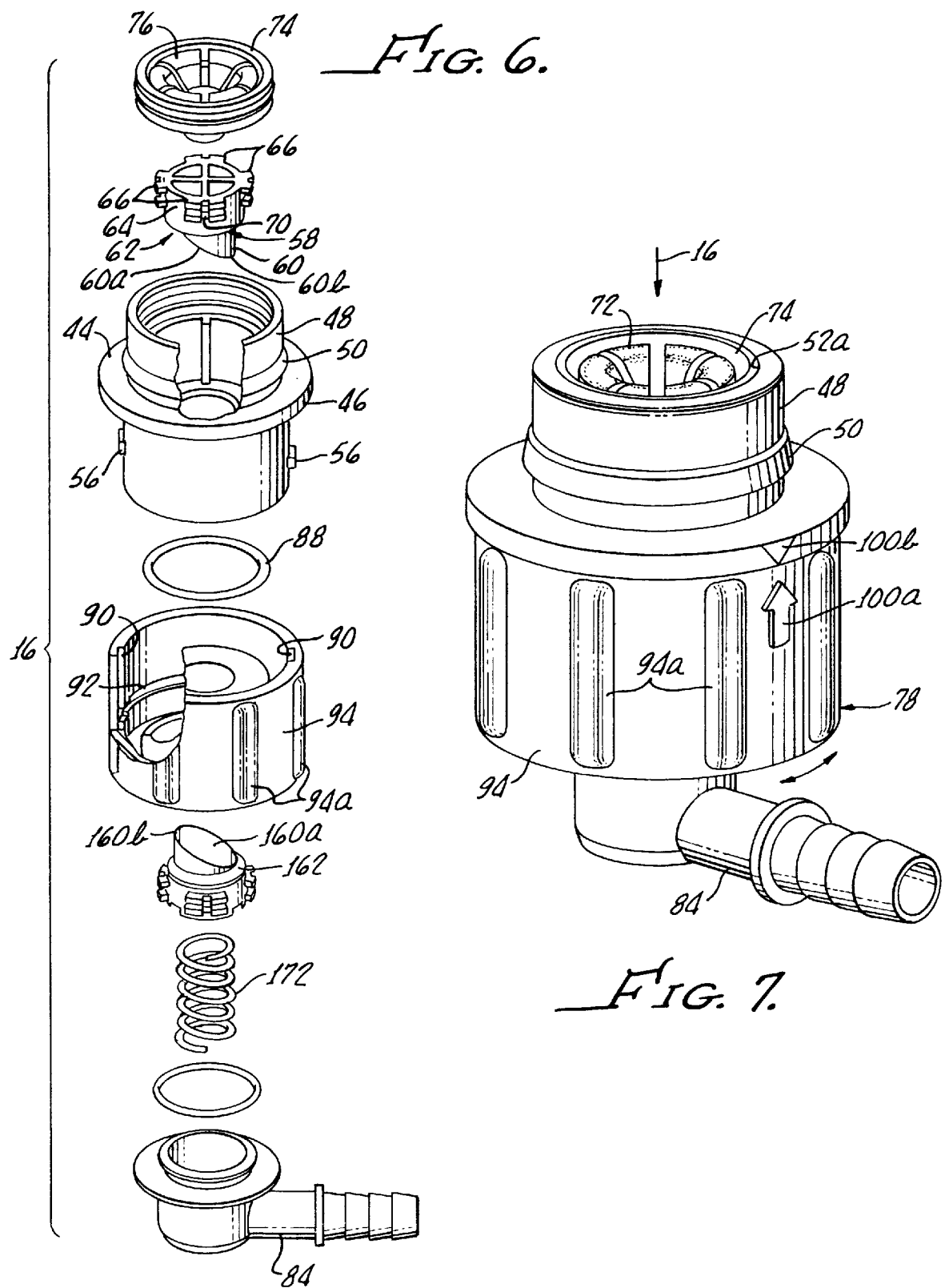

COUPLING VALVE APPARATUS AND METHOD

BACKGROUND OF THE INVENTION

1. Field of the Invention

The present invention is in the field of fluid-flow couplings which may be generally characterized as of the "mutually-closing, dry break" type. Such couplings are arranged to be interconnected in order to allow a fluid to flow between the couplings (i.e., usually between a pair of hoses or conduits, or between a tank or vessel and a conduit, for example). Upon being disconnected, the couplings mutually reseal so that fluid does not flow to the ambient. Additionally, the residual volume of fluid released to the ambient upon disconnection of the couplings is minimal.

More particularly, the present invention relates to a fluid-flow coupling which includes a complementary first part and second part, which when connected to one another may effect fluid-flow communication. When the coupling parts are connected they may be used to effect fluid-flow communication between a vessel and a conduit, for example. When the coupling parts are disconnected they mutually reseal so that fluid is not lost either from the conduit or from the vessel. Additionally, the "dry break" aspect of these couplings means that each coupling part desirably has a minimal retention volume of fluid, which fluid is not sealed either in the first or second coupling part upon disconnection, and which is thus released into or exposed to ambient conditions.

Further, the present invention relates to such a coupling which additionally has a controllable valve mechanism integrally formed as part of each coupling part, and which allows a user of the coupling parts to connect them while preventing fluid flow communication through the coupling. Alternatively, the user can fully open fluid flow communication through the connected coupling parts, or can regulate this fluid flow to control a flow rate of fluid between a vessel and a conduit, for example.

2. Related Technology

A conventional coupling structure is known in accord with U.S. Pat. No. 4,942,901, (the '901 patent), issued 24 Jun. 1990 to Petro Vescovini. It is believed that this '901 patent discloses a coupling structure having a first coupling and a second coupling which are both generally cylindrical. These couplings axially engage with and disengage from one another. When the couplings are engaged, a poppet valve of each coupling engages the poppet valve of the other to mutually force the poppet valves off their respective seats. The poppet valves are referred to by Vescovini as shutter valves, and each includes a protrusion engaging the protrusion of the other shutter valve to mutually open these shutter valves. When the couplings of the '901 patent are disengaged from one another, the shutter valves are closed by respective springs so that each coupling closes a respective conduit or hose to which it is attached.

Another conventional coupling which is similar in some respects to that disclosed in the Vescovini '901 patent, is set out in U.S. Pat. No. 5,316,041, (the '041 patent), issued 31 May 1994, to Patrick J. Ramacier, et al. The '041 patent is believed to disclose a quick disconnect coupling structure in which a male and female coupling members are axially engageable with and disengageable from one another. When the coupling members are engaged with one another, a poppet valve member of each is unseated and allows fluid flow between the coupling members. When the coupling members are disconnected from one another, each poppet valve member reseats under the bias provided by a respective spring, and the conduits or hoses with which the coupling members are associated are thus closed.

Still another coupling structure is seen in U.S. Pat. No. 4,421,146 (the '146 patent), issued 20 Dec. 1983 to Curtis J. Bond, et al. A coupling structure according to the '146 patent includes a tubular spout attached to and in fluid communication with a fluid-filled vessel, such as a bag held within a cardboard box. This spout portion includes a plug member which is axially moveable between a first position closing fluid communication between the vessel and an outer portion of the spout member, and a second position opening this fluid communication. In the second position of the plug member a pair of lateral openings at an inner portion of the plug member are moved inwardly of the spout to permit fluid communication between the vessel and the outer portion of the spout.

A service member (i.e., the male coupling part) is carried in a guide structure which clamps to the spout and guides the service member for axial sliding engagement into sealing relation with the spout. The service member provides communication with a conduit, and includes a valve member closing communication between the conduit and ambient when the service member is disconnected from the spout. The service member as it engages the spout is also engageable with the plug member to move it between its two positions, and engagement between the service member and plug member opens the valve in the service member. Thus, when the service member is engaged into the spout, communication between the vessel and the conduit is established. Further, it is seen that the plug member of the '146 patent carries an axial projection which contacts the valve member of the service member (the male coupling part), and opens this valve member.

When the service member and spout member of the coupling according to the '146 patent are axially disengaged from one another, a small volume of fluid is retained outwardly of the valve member and spout. This retention volume of fluid is small because the service member defines a domed end surface, and the plug member has a matching contoured end wall closely fitting to the valve member. The lateral ports of the plug member are themselves of small volume, and the passage leading to the plug member is small and is mostly filled by the plug valve member itself when this member is moved to its closed position.

Another conventional coupling, which may be considered to be of hermaphrodite configuration, is known from European patent application No. 0 294 095 A1, published 7 Dec. 1988 (the '095 application). According to the '095 application, a "male" and "female" coupling parts are brought into alignment and juxtaposition by a yoke carried on a guide housing. The male coupling part is configured as a tubular member which is axially movable by a handle on the guide housing to engage with an annular valve member carried in the female coupling part. When the male and female coupling parts are coupled with one another (i.e., by extension of the male coupling part relative to the guide housing and into the female coupling part), an inner liquid extraction flow path is separated from an outer air-entrance (or pressurized gas delivery) flow path by the annular valve member of the female coupling. In the coupled condition of the male and female couplings, the annular valve member of the female coupling part also serves as a sealing member. A version of this coupling is also known in which the male coupling part carries a spring-loaded internal disk valve member which closes the liquid extraction flow path of the male coupling part when the male and female coupling parts are not coupled with one another.

SUMMARY OF THE INVENTION

In view of the deficiencies of the related technology it is an object for this invention to avoid one or more of these deficiencies.

In view of the deficiencies of the related technology, it can be seen that a need exists for a fluid coupling which also allows for regulation of the fluid flow occurring through the coupling.

Further, a need exists for such a fluid coupling which provides substantially a "dry break" when the portions of the coupling have to be disconnected from one another.

Accordingly the present invention provides a two-part coupling valve apparatus having a separable first coupling part and second coupling part, the first coupling part and the second coupling part being mutually axially interengageable in sealing relation to lock axially together to define a fluid flow path passing through the coupling valve apparatus, and allowing relative rotational movement while locked axially together to open and regulate fluid flow in the flow path, the coupling valve apparatus comprising: each the first and second coupling part having: a respective tubular body defining cooperating means for axially engaging sealingly with the other of the first coupling part and second coupling part, means for locking in axial inter-engagement while allowing relative rotation of the coupling parts; a respective portion of a fluid flow path extending through both the coupling parts when engaged; and a respective valve seat through which the fluid flow path passes; a respective valve member rotational with and axially movable in the respective tubular body to engage the respective valve seat and close fluid communication in the respective portion of the flow path; each valve member having a respective camming surface confronting and engageable with the camming surface of the other of the respective valve members; and means yieldably urging each valve member toward sealing engagement with its respective seat; whereby, the respective camming surfaces of the valve members engage one another and relatively rotate upon relative rotation of the coupling parts to axially unseat each valve member from its respective valve seat.

According to another aspect, the present invention discloses a method of providing a two-part coupling valve apparatus having a separable first coupling part and second coupling part in order to engage these coupling parts in sealing relation to lock axially together and define a fluid flow path passing through the coupling valve apparatus, and upon relative rotation of the coupling parts to open and regulate fluid flow in the flow path, the method including steps of: providing each of the first and second coupling parts with a respective tubular body, using this tubular body to define cooperating means for axially engaging sealingly with the other of the first coupling part and second coupling part, providing means for locking the tubular bodies together in axial inter-engagement while allowing relative rotation of the coupling parts; providing a respective portion of a fluid flow path extending through both the coupling parts when engaged; and providing each of the tubular bodies with a respective valve seat through which the fluid flow path passes; providing a respective valve member rotational with and axially movable in the respective tubular body to engage the respective valve seat and close fluid communication in the respective portion of the flow path; providing each valve member with a respective camming surface confronting and engageable with the camming surface of the other of the respective valve members; and engaging the camming surfaces with one another and relatively rotating these engaged camming surfaces upon relative rotation of the coupling parts to axially unseat each valve member from its respective valve seat.

An advantage of the present invention is that the coupling valve apparatus provides both for coupling of fluid sources or conduits to one another, as well as providing for substantially a "dry break" between the sources and conduits when disconnection is necessary. Further, the coupling valve apparatus allows a user of the apparatus to regulate the fluid flow occurring between the interconnected fluid sources or conduits.

These and additional objects and advantages of the present invention will be apparent from a reading of the following detailed description of an exemplary preferred embodiment of the invention taken in conjunction with the appended drawing Figures, which are briefly described immediately below.

BRIEF DESCRIPTION OF THE DRAWING FIGURES

FIG. 1 provides a perspective view of a fluid dispensing system, including a fluid-holding vessel and a fluid conduit in fluid flow communication with one another by use of a coupling apparatus embodying the present invention;

Figure 2:
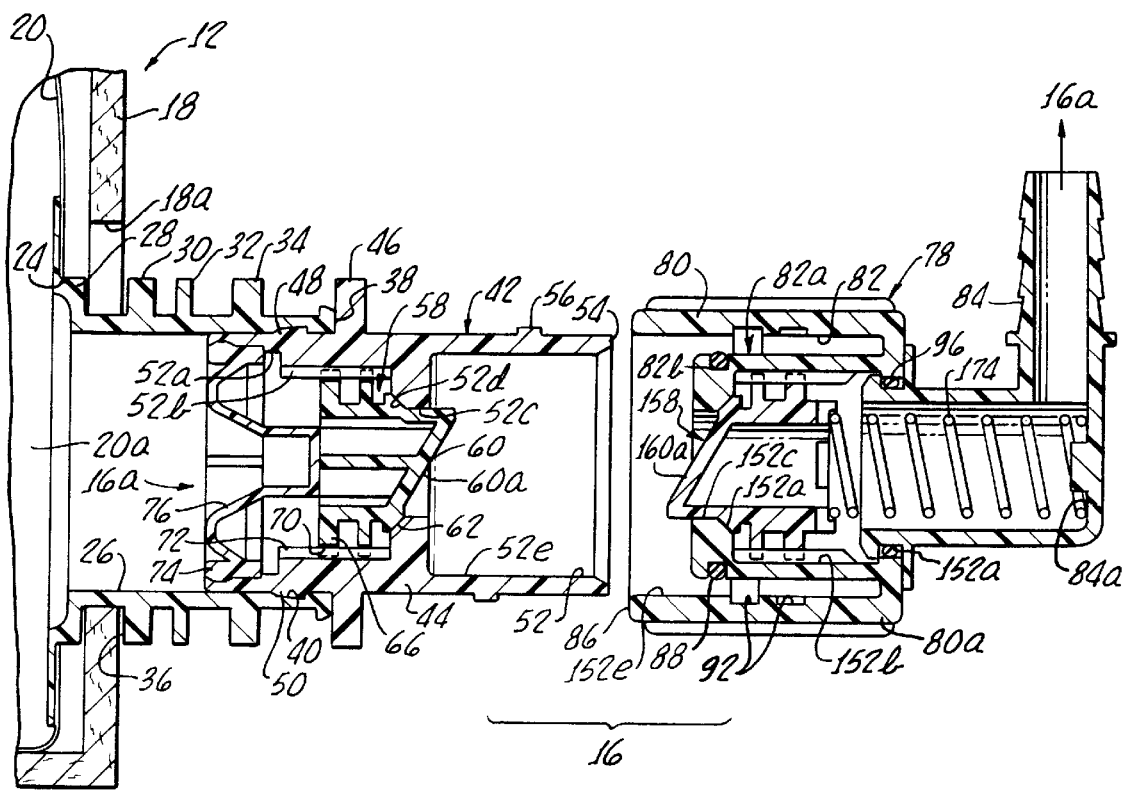
FIG. 2 is an enlarged longitudinal cross sectional view of a coupling apparatus according to an exemplary preferred embodiment of the present invention preparatory to coupling together of first and second parts of the coupling apparatus.
Figure 3:
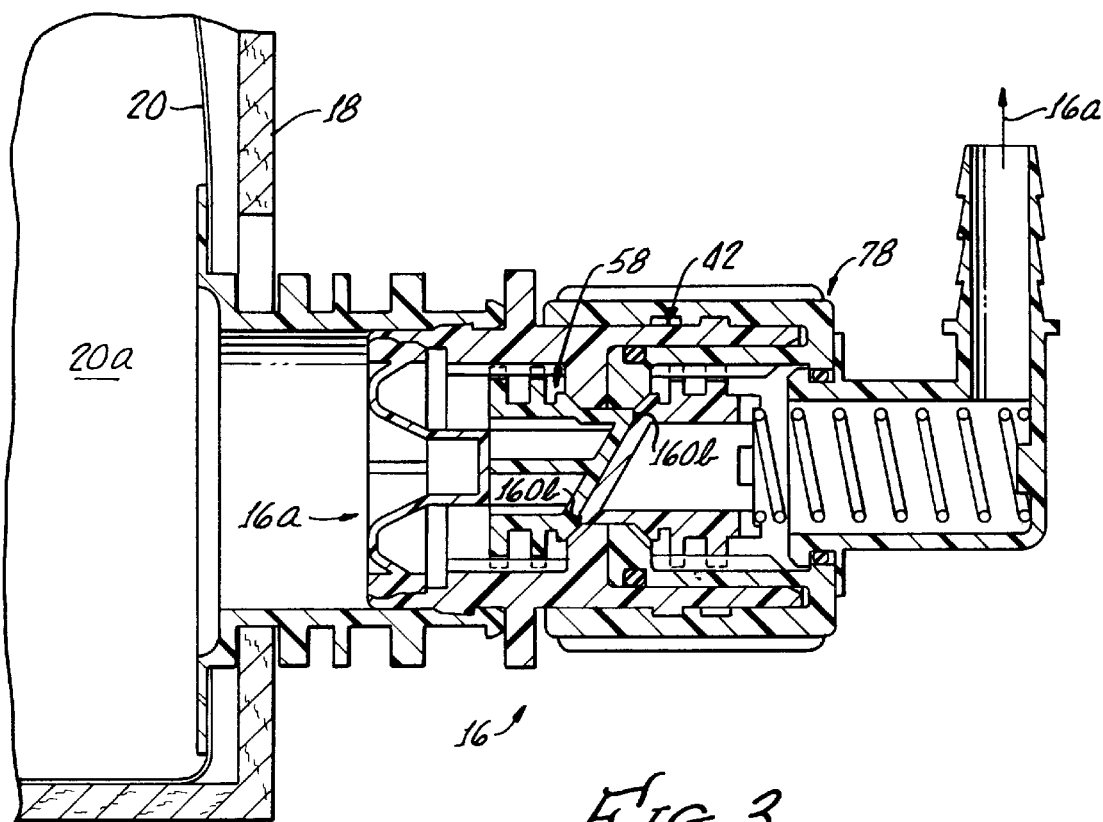
FIG. 3 is an enlarged longitudinal cross sectional view similar to FIG. 2 showing the first and second coupling parts coupled together while fluid communication between the vessel and conduit is maintained closed.
Figure 4:
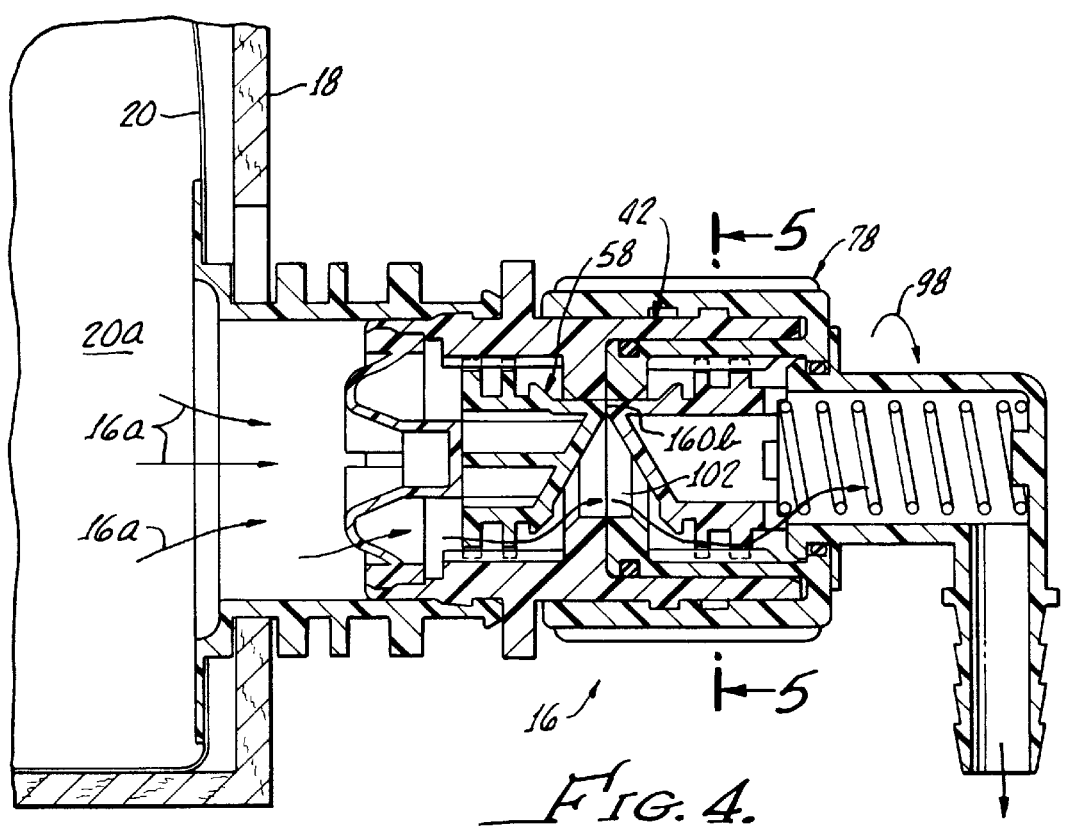
Figure 5:
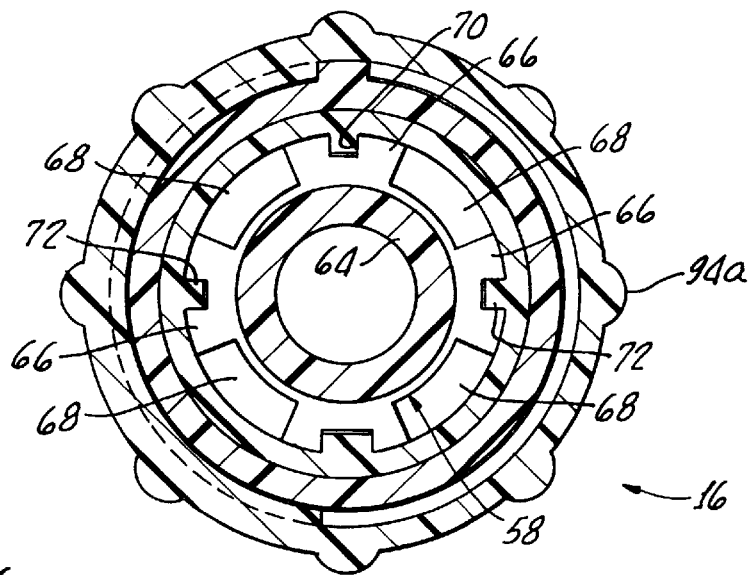
Figure 8:
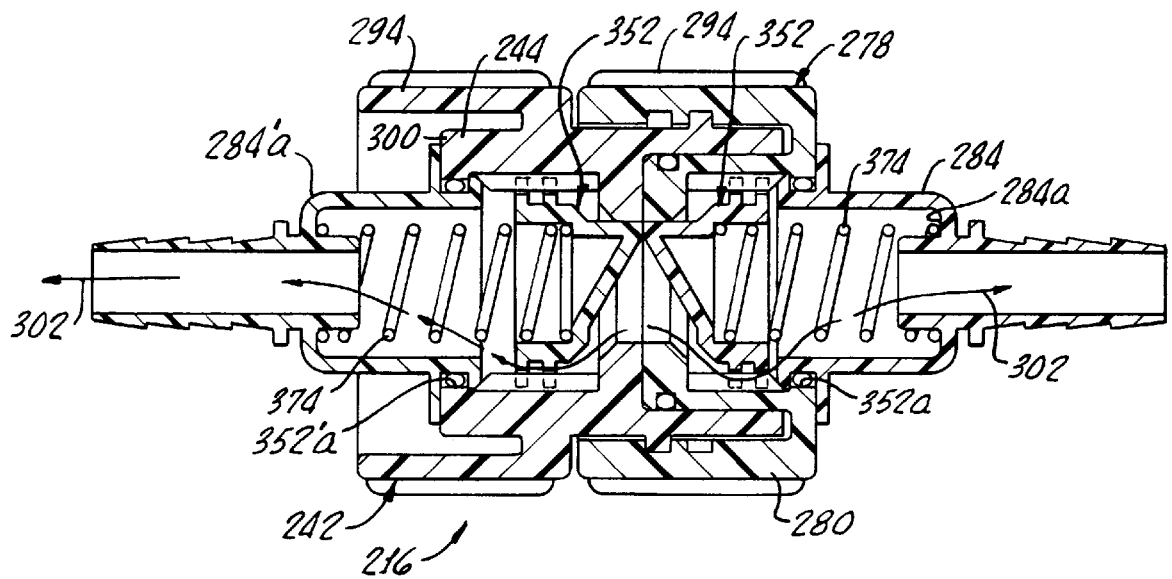

FIG. 4 provides an enlarged longitudinal cross sectional view similar to FIGS. 2 and 3, but showing the first and second coupling parts coupled together and relatively positioned so that fluid communication between the vessel and conduit is opened;

FIG. 5 is a cross sectional view taken along line 5—5 FIG. 4;

FIG. 6 provides an exploded perspective view of the first and second parts of the coupling apparatus. The orientation of the coupling parts in FIG. 6 is selected for convenience of illustration;

FIG. 7 is a view of the first and second parts of the coupling apparatus coupled together and relatively positioned in order to allow fluid flow between the coupling parts. The viewer will note that the orientation of the coupling apparatus in FIG. 7 is the same as that of FIG. 6 for convenience of illustration; and FIG. 8 provides an enlarged longitudinal cross sectional view of an alternative embodiment of first and second coupling parts coupled together and relatively positioned so that fluid communication between the coupling parts is opened.

DETAILED DESCRIPTION OF EXEMPLARY PREFERRED EMBODIMENTS OF THE INVENTION

Figure 1:
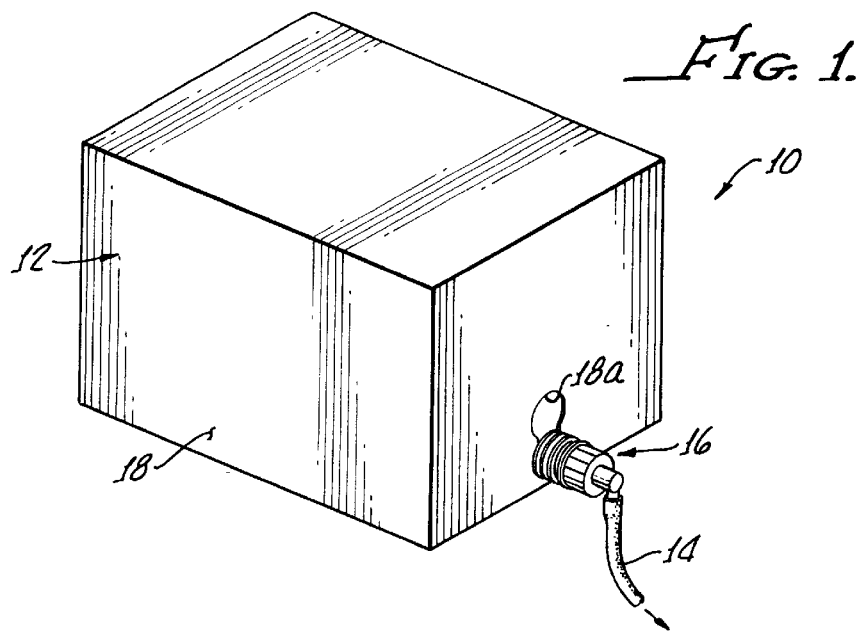

Viewing FIG. 1, a liquid dispensing system 10 is schematically depicted. This dispensing system 10 includes a liquid-holding container 12, which may be communicated with a conduit 14 by use of a two-part coupling structure 16 to be further described below. The container 12 may be of any desired construction, but the illustrated container is of the bag-in-box configuration. It will be understood that the invention is in no way limited to use of a bag-in-box type of container. The bag-in-box container 12 includes an outer shape-retaining box 18 of corrugated paperboard, and an inner flexible bag 20 (best seen in FIG. 2), which is generally fabricated of plastic sheet. The bag 20 defines a variable-volume cavity 20a, which may decrease in volume, for example, as liquid is withdrawn from the container 12 via conduit 14.

As FIGS. 2–4 illustrate, the container 12 includes a tubular bag fitting member 22 which is sealed on the bag 20 at an opening 24 of this bag. Thus, a through bore 26 of the bag fitting is in fluid flow communication with the cavity 20a. Outwardly, the fitting member 22 defines a number of spaced-apart, radially-extending flanges 28–34, two of which cooperatively define a groove 36 into which a portion of the paperboard wall of box 18 is received at a key-hole opening 18a of this box (seen best in FIG. 1). Thus, the fitting 22 is captively held in the opening 18a of the box 18.

Spaced inwardly of the through bore 26 adjacent to a distal end 38 of the fitting 22, is an outwardly extending circumferential groove 40 defined on the bore 26. A first coupling part 42 includes a tubular body 44 having a radially extending flange portion 46 abutting the end 38 of the fitting 22, and a tubular portion 48 received into the bore 26, with a radially outwardly extending rib 50 sealingly received in groove 40. Referring to FIGS. 2–6 in conjunction to one another, it is seen that the body 44 defines a stepped through bore 52. Considered from the cavity 20a outwardly (that is, to the right as seen by a viewer of FIG. 2), the bore 52 includes a large diameter section 52a, leading to a smaller diameter section 52b, and then to a section of smallest diameter 52c, having a seating surface 52d intermediate of these two sections. The section 52c opens to a large diameter section 52e, which extends to the end 54 of the body 44. Outwardly, the tubular body 44 defines a pair of diametrically-opposite and axially-spaced, radially-extending lugs 56. The lugs 56 are not quite 180° apart from one another, which provides for a single unique rotational relative position of inter-engagement of the parts of coupling 16, as will be seen. In other words, the coupling parts are "polarized", and will fit together in only one way.

Movably received into the bore sections 52b and 52c is a valve member 58. This valve member 58 may better be seen referring also to FIG. 6. The valve member 58 includes a nose portion 60 extending into the bore section 52c, and a circumferentially extending valve surface 62 sealingly engageable with the seating surface 52d. The nose portion 60 includes an angulated, circumferentially-extending camming surface 60a. In the illustrated embodiment, the camming surface 60a is wedge-shaped. The invention is not limited to use of a wedge-shaped camming surface, and it will be apparent to those skilled in the pertinent arts that other configurations of relatively rotational cooperative camming surfaces can be employed. For example, a circumferentially extending sinusoidal camming surface might be used on the valve member 58. In order to guide the valve member 58 in the bore section 52b, a cylindrical body 64 of the valve member 58 is provided with four circumferentially spaced apart protrusions 66 cooperatively defining axially extending channels 68 therebetween. Each protrusion 66 is provided with a respective axially-extending groove 70, and the body 44 of the first connector part 42 is provided with four axially extending guide ribs 72 on the bore portion 52b. The valve member 58 is movably received in the bore 52, with the protrusions 66 each receiving one of the guide ribs 72 in the respective groove 70. Thus, it is seen that the valve member 58 is axially but not rotationally movable in the bore 52. Urging the valve member 58 into sealing engagement at its valving surface 62 with the seating surface 52d is a disk-like resilient molded plastic spring member 74. This spring member 74 includes plural resilient plastic legs 76, which are yieldable to allow the valve member 58 to be moved to an open position (seen in FIG. 4) in which the surfaces 62 and 52d are spaced apart to allow fluid flow through the bore 52.

Considering now the second coupling part 78, it is seen that many parts of the same or analogous construction are present. For this reason, features of the coupling part 78 which are the same as or analogous in structure or function to those depicted and described above are referenced with the same numeral used previously, and having one-hundred (100) added. Viewing FIGS. 2–6, it is seen that the coupling part 78 includes a tubular body 80 having a stepped through bore 152, and a circumferentially and axially extending recess 82 on this bore. Outwardly of the recess 82, the body 80 includes a tubular sleeve portion 80a. The bore 152 includes a small diameter section 152a in which is rotationally received an L-shaped hose barb member 84, a somewhat larger diameter section 152b leading to a smaller diameter section 152c with a tapering seating surface 152d, and a larger diameter section 152e opening outwardly on an end 86 of the body 80. The bore section 152e is effectively extended axially into the recess 82. The recess 82 effectively provides an axially extending cylindrical boss 82a aligned with the bore section 52e of the first coupling part 42, as will be seen. The boss 82a defines a circumferentially extending radially outwardly opening groove 82b, in which is received an O-ring sealing member 88.

Extending axially along the radially inwardly disposed surface of the bore section 152e and recess 82 (i.e., on the radially inner surface of the sleeve portion 80a) is a pair of diametrically opposite grooves 90 (i.e., not quite 180° apart from one another circumferentially-positioned to match the locations of lugs 56, best seen in FIG. 6). Each groove 90 extends to a respective one of a pair of circumferentially-extending, axially-spaced grooves 92; each of which extends only about 180° about the inner perimeter of the body 80 on bore 152e (i.e., that is, on the inner surface of sleeve portion and within the recess 82 which effectively deepens the bore section 152e and provides the boss 82a). Outwardly, the body 80 defines a circumferentially extending manual-gripping surface 94 on the sleeve portion 80a, which is provided with axially extending ribs 94a in order to provide a good manual purchase on the body 80. Further considering FIGS. 2–6, it is seen that the second coupling part 78 includes a valve member 158 with camming surface 160, and a spring 174 extending from the valve member 158 to a spring seat surface 84a on the hose barb member 84 and yieldably urging this valve member into sealing engagement at a valving surface 162 onto the seating surface 152d. An O-ring sealing member 96 is carried upon the hose barb member 84, and sealingly engages the body 80 at bore section 152a in order to allow sealing relative rotation of the member 84.

Considering now FIGS. 2 and 3 particularly, it is seen that the first and second coupling parts (i.e., parts 42 and 78) can be engaged with one another so that the camming surfaces 60a, 160a of the valve members 58 and 158 confront (but do not engage) one another. In order for these coupling parts to be engaged, the outer portion of body 44 is inserted into the bore section 152e of the body 80 (and into recess 82), with boss 82a being received into bore section 52e. In this inter-engagement of the coupling parts 42 and 78, it may be seen that the boss 82a nests into the recess at bore section 52*e*, while the portion of the body 44 around this recess 52*a* is nested into the annular recess 82 within sleeve portion 80*a*. The lugs 56 each must be aligned with and pass axially along the respective one of the grooves 90 to the circumferential alignment of the grooves 92. Because both the lugs 56 and the grooves 90 are similarly spaced not quite 180° from one another (but in matching circumferential dispositions) there is only a single relative rotational position for the first and second coupling parts in which the lugs 56 can fit into grooves 90. In this position of axial interengagement, a slight clockwise relative rotation of the second coupling part relative to the first coupling part both moves the lugs 56 out of alignment with the grooves 90 (locking the coupling parts together axially), and brings the camming surfaces 60*a* and 160*a* into engagement with one another, as is seen in FIG. 3. The valve members 58 and 158 are still sealingly engaging their respective seats 52*d* and 152*d* in the relative position of the coupling parts seen in FIG. 3. The coupling parts 42 and 78 also cooperatively define an inchoate flow path indicated with the arrowed numeral 16*a*, which in not yet open for fluid flow.

In order for the user of the coupling 16 to open each coupling part and allow fluid flow from the container 12 to conduit 14, the completion of a relative rotation of about 180° must be applied, as is indicated by arrowed numeral 98, viewing FIG. 4. As is seen in FIG. 7, this relative rotation of the coupling parts brings an index arrow 100*a* into axial alignment with an index mark 100*b*, indicating to the user that the coupling 16 is fully open. As this relative rotation of the coupling parts 42 and 78 takes place, the camming surfaces 60*a* and 160*a* engage one another and relatively rotate, each staying in a fixed relative rotational position with its respective coupling part. In other words, the camming surfaces 60*a* and 160*a* are relatively rotational, each rotating with its respective coupling part. When the coupling parts are relatively rotated, the camming surfaces 60*a* and 160*a* relatively rotate, and cause relative axial motion of the valve members 58 and 158.

As is seen in FIG. 4, the camming surfaces 60*a* and 160*a* each have a respective apex surface 160*b*, which surfaces engage one another in the fully opened position of the coupling in order to hold each valve member 58 and 158 in a fully opened relative position. In this condition of the coupling parts 42 and 78, fluid may flow from the cavity 20*a* between the legs 76 of the spring disk 74, between the protrusions 66 along channels 68, past the seating surfaces 52*d* and 152*d*, past the valve member 158 in the same way as described for valve member 52, between the coils of spring 174, and out the hose barb member 84, all as is depicted on FIG. 4 with arrowed numeral 102. The potential flow path indicated above with arrowed numerals 16*a* is now completed in other words, and the flow along this path is indicated with arrow 102. Although in this case fluid flow is depicted with arrow 102 as being directed from the container 12 to the conduit 14, it will be understood that the invention is not limited to this direction of fluid flow. Fluid may flow through the engaged couplings when they are positioned to open the valve members 58 and 158 in either direction. In other words, the flow path 16*a* is now open for flow between the container 12 and the conduit 14.

Importantly, it is to be noted that the coupling parts 42 and 78 need not be relatively turned to the fully opened position seen in FIGS. 4 and 7. That is, the user of the coupling 16 may choose to relatively rotate the coupling parts only a fraction of the way from the closed position toward the fully opened position seen in FIG. 7. In this case, the axial relative movements of the valve members 58, 158 will each be less than their respective full axial relative movements. Thus, the valve members 58, 158 will each be only partially opened, and the rate of fluid flow through the flow path 16*a* can be regulated by controlling the amount of relative rotation of the coupling parts 52 and 78. The rotational friction within the coupling is sufficient to cause it to retain a selected position of relative rotation. Thus, the user of the coupling can choose a position of relative rotation of the coupling parts in order to regulate a fluid flow rate through the coupling, and this selected position of regulation will be retained until the user next changes it by relatively rotating the coupling parts 42 and 78.

Importantly, a user of the coupling 16 can also shut off the fluid flow through the connected coupling parts 42 and 78 without the need to disconnect these coupling parts. That is, by simply reversing the relative rotation of the coupling parts 42 and 78 toward but slightly short of their initial position of inter-engagement, the valve members 58 and 158 are each returned to their closed positions illustrated in FIG. 2. The user can return the coupling to this condition by relative rotation of the coupling parts 42 and 78 without the coupling parts being disconnected from one another. It is important to note that the valve members 58 and 158 fully close before the coupling parts return to their position allowing the lugs 56 to align with slots 90. Thus, in the event that the coupling 16 is being used to communicate a pressurized fluid, the fluid pressure between the couplings is shut off before they can separate, and the user is not subjected to a risk of the coupling parts being pushed apart suddenly and surprisingly by pressurized fluid between the coupling parts. Thus, should the user wish to also disconnect the coupling parts 42 and 78 from one another, a slight additional relative rotation in the reverse direction will align the lugs 56 with the slots 90 and allow the parts to be disconnected axially from one another by the user pulling on the coupling parts.

An important feature to note is the depth of the recess on coupling part 42 at bore section 52*e*. The boss 82*a* of the coupling part 78 is received into this recess, with the seal member 88 being disposed near the free end of this boss. This means that in situations where the coupling 16 is being used to communicate pressurized gas, the small volume of pressurized gas captured between the valve members 58 and 158 when the coupling parts are mutually closed is expanded and reduced in pressure as the coupling parts are separated and before the boss 82*a* withdraws fully from the recess at bore section 52*e*. Thus, a user of the coupling 16 is not subjected to a "puff" of gas at the full line pressure upon disconnecting the coupling parts 42 and 78. Such a release of pressurized gas presents a hazard that ambient dust and debris may be blown about, perhaps into an eye of the user. With the present coupling, the pressurized gas is reduced in pressure to a lower and relatively safe level. Further, the outward release of such pressurized gas as boss 82*a* withdraws from bore section 52*e* is shielded by the radially congruent portion of the body 80 at bore section 152*e*. Escaping gas will be directed axially along the outer surface of the coupling 42 with greater, not radially outwardly as in some conventional couplings to possibly stir up ambient dust and debris. Thus, the axial direction of release of pressurized fluid upon disconnection of the coupling parts is also a safety feature of the present coupling.

FIG. 8 depicts a two-part coupling valve according to an alternative embodiment of the invention. In order to obtain reference numerals for use in describing the embodiment of FIG. 8, features of this alternative embodiment which are the same as, or which are analogous in structure or function to, features depicted and described above are indicated on FIG.

8 with the same numeral used above, but increased by two-hundred (200). First of all, viewing FIG. 8 it is seen that each of the coupling parts 242 and 278 are configured to include a hose barb. The coupling part 278 is substantially the same as coupling part 78, except that the hose barb member 284 in this embodiment has been configured to extend axially rather than to be L-shaped as in the embodiment first described above. In this axial configuration of the hose barb member, the spring seat feature 284a is annular, and is arranged about the flow path 302, as shown. Coupling part 242 similarly now includes an axially-aligned hose barb member 284a'. In order to allow the hose barb member 284a' to mount to the body 244, this body is provided with an annular boss 300 inwardly defining a bore portion equivalent to portion 352a of coupling part 278, and also indicated with this reference numeral having a prime added. The body 244 is also provided with a portion having a gripping surface 294', which is similar in configuration to the gripping surface 294 provided on the body 280, and which is thus indicated with the analogous numeral in FIG. 8.

Consideration of FIG. 8 will make clear that the embodiment of the coupling 216 there illustrated provides for connection of two conduits to one another via the coupling. In addition to providing this connection of conduits to one another, the valving function of the present inventive coupling allows a user to regulate or throttle the fluid flow between the conduits by controlled relative rotation of the coupling parts. The couplings 16 and 216 are not limited to communication of liquids, and it is to be understood that gaseous fluids may be communicated by use of the present inventive couplings.

Further considering each of the embodiments depicted and described above, it will be apparent that when the coupling parts are to be disconnected, the user will first have to return the parts to their relative rotational position in which the lugs 56 align with axial grooves 90. In this relative rotational position for the coupling parts, the valve members 58 and 158 will have returned to their positions seen in FIG. 3. As the valve members 58 and 258 return to this position, the volume of fluid disposed between these valve members (i.e., about nose sections 60 and between valve seats 52d and 152d) is reduced to a very small volume. This retention volume will be exposed to ambient when the coupling parts 42 and 78 are separated. However, as is seen in FIG. 3, there is only a very little such retention volume. Dependent upon manufacturing tolerances and variability in the coupling parts 42 and 78, the retention volume of fluid retained between the seats 52d and 152d can be controlled to be only a small amount.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. For example, is it apparent that each part of the coupling could be used alone with a fitting providing for its inter-engagement and relative rotation to open the fluid flow path in the coupling part, allowing fluid communication with the fitting. The fitting itself need not be provided with a valve member, but simply with a camming surface which will open the valve member of the coupling part upon relative rotation of the two. Accordingly, the invention is not limited to the precise exemplary preferred embodiments depicted and described in this writing, but is intended to be limited only be the spirit and scope of the appended claims, giving cognizance to equivalents in all respects.

I claim:

1. A two-part coupling valve apparatus having a first coupling part and second coupling part, said first coupling part and said second coupling part being mutually axially inter-engageable in sealing relation to cooperatively defining a fluid flow path passing through the coupling valve apparatus, and allowing relative rotational movement while so engaged to controllably open, regulate, and close fluid flow in the flow path, said coupling valve apparatus comprising:

each said first coupling part and said second coupling part having:
a respective tubular body defining cooperating means for axially engaging sealingly with the other of the first coupling part and second coupling part, means for allowing relative rotation of the coupling parts while so engaged, a respective portion of a fluid flow path extending through both the coupling parts when engaged, and a respective valve seat through which the fluid flow path passes;
a respective valve member rotational with and axially movable in the respective tubular body to engage the respective valve seat and close fluid communication in the respective portion of the flow path, each valve member having a respective camming surface engageable with the camming surface of the other of the respective valve members; and
means yieldably urging each valve member toward sealing engagement with its respective valve seat;
whereby, the respective camming surfaces of the valve members confront one another upon inter-engagement of the coupling parts, and engage one another upon relative rotation of the coupling parts to mutually cam one another off the respective valve seats controllably opening fluid communication along the flow path.

2. The two-part coupling valve apparatus according to claim 1 wherein said respective valve member includes a valve member body, and said valve member body and said tubular body defining cooperating means allowing relative axial motion of the valve member while being coupled to the tubular body rotationally.

3. The two-part coupling valve apparatus according to claim 2 wherein said cooperating means allowing relative axial motion of the valve member while being coupled to the tubular body rotationally includes the valve member body having a radially outwardly extending plurality of protrusions spaced circumferentially apart to define fluid flow channels therebetween, each protrusion defining an axially extending groove, and the tubular body having a bore defining a portion of the flow path within the tubular body, a plurality of internally radially inwardly extending and axially extending ribs on said bore with each rib being received axially slidably in one of the grooves of the valve member body.

4. The two-part coupling valve apparatus according to claim 2 wherein said respective valve member includes a valving surface circumscribing said valve member body and sealingly engageable with the respective valve seat.

5. The two-part coupling valve apparatus according to claim 1 wherein said respective valve member includes a valve member body, said valve member body having a nose section extending axially toward the other of said coupling parts, and said nose section defining said camming surface.

6. The two-part coupling valve apparatus according to claim 5 wherein said camming surface is substantially wedge-shaped.

7. The two-part coupling valve apparatus according to claim 1 wherein said means for allowing relative rotation of the coupling parts while engaged, and said cooperating means of the tubular body for axially engaging sealingly with the other of the first coupling part and second coupling part includes the tubular body defining one of a matching cylindrical boss and cylindrical recess, a sealing member interposed between the boss and recess, one of the coupling parts defining an axially extending groove extending to a circumferentially extending groove, and the other of the coupling parts defining a lug extending radially and being slidably receivable both axially and circumferentially in the grooves of the one coupling part.

8. The two-part coupling valve apparatus according to claim 1 wherein said means yieldably urging each valve member toward sealing engagement with its respective valve seat includes a disk-like resilient member having a plurality of radially-extending legs cooperatively defining openings therebetween through which fluid may flow.

9. The two-part coupling valve apparatus according to claim 1 wherein said means yieldably urging each valve member toward sealing engagement with its respective valve seat includes a coil spring extending between one of the respective valve members and a spring seat defined by a respective one of the coupling parts.

10. A two-part coupling valve apparatus having a first coupling part and second coupling part, said first coupling part and said second coupling part being mutually axially inter-engageable in sealing relation to cooperatively defining a fluid flow path passing through the coupling valve apparatus, and allowing relative rotational movement while so engaged to controllably open, regulate, and close fluid flow in the flow path, said coupling valve apparatus comprising:

said first coupling part having a respective first tubular body defining a through flow path opening axially on an end of the tubular body, said first tubular body having a stepped bore defining a portion of the flow path and defining a recess at the end of the tubular body, a reduced diameter section of the bore defining a valve seat disposed away from the recess, and a larger diameter section of the bore adjacent to the valve seat, a valve member disposed movably in the larger diameter bore section having a valving surface sealingly engageable with the valve seat, said first tubular body and said valve member defining cooperating means for allowing relative axial motion to seat and unseat the valve member from the valve seat while constraining the valve member against rotation relative to the first tubular body, resilient means for yieldably urging the valve member toward its seat;

said second coupling part having a respective second tubular body having a stepped bore defining a through flow path opening axially on an end of the tubular body, said second tubular body having a bore section and extending annular recess within which is disposed an axially extending boss, said boss being receivable into said recess of said first coupling part and said first coupling part being receivable into said bore section and recess to nest together; said second tubular body outwardly including a sleeve section receivable over a portion of said first tubular body, and said first tubular body and second tubular body defining cooperating means within said sleeve section for allowing axial inter-engagement and relative rotation while so interengaged; a reduced diameter section of the bore defining a valve seat disposed away from the boss, and a larger diameter section of the bore adjacent to the valve seat, a valve member disposed movably in the larger diameter bore section having a valving surface sealingly engageable with the valve seat, said second tubular body and said valve member defining cooperating means for allowing relative axial motion to seat and unseat the valve member from the valve seat while constraining the valve member against rotation relative to the second tubular body, resilient means for yieldably urging the valve member toward its seat;

each of said valve members including a nose section extending axially toward the other valve member, and a axially and circumferentially extending camming surface on said nose section confronting and engageable with the camming surface of the other valving member upon relative rotation of the coupling parts while inter-engaged to mutually cam the valve members away from the respective valve seats.

11. The two-part coupling valve apparatus according to claim 10 wherein said cooperating means allowing relative axial motion of the valve member while being rotationally coupled to the respective tubular body includes the valve member having a radially outwardly extending plurality of protrusions spaced circumferentially apart to define fluid flow channels therebetween, each protrusion defining an axially extending groove, and the tubular body on said larger diameter section of the bore defining a plurality of internal radially inwardly and axially extending ribs with each rib being received slidably in one of the grooves of the valve member.

12. The two-part coupling valve apparatus according to claim 10 wherein said camming surface is substantially wedge-shaped.

13. The two-part coupling valve apparatus according to claim 10 wherein said cooperating means for allowing relative rotation of the coupling parts while engaged includes said sleeve section of said second coupling part defining an axially extending radially inwardly disposed groove extending to a circumferentially extending radially inwardly disposed groove, said first coupling part defining a radially outwardly extending lug slidably receivable both axially and circumferentially in the respective grooves of the second coupling part.

14. The two-part coupling valve apparatus according to claim 10 wherein one of said means yieldably urging a valve member toward sealing engagement with its respective valve seat includes a disk-like resilient member having a plurality of radially-extending circumferentially spaced apart legs cooperatively defining openings therebetween through which fluid may flow.

15. The two-part coupling valve apparatus according to claim 10 wherein said means yieldably urging a valve member toward sealing engagement with its respective valve seat includes a coil spring extending between one of the respective valve members and a spring seat defined by a respective one of the coupling parts.

16. A method of providing a two-part coupling valve apparatus having a separable first coupling part and second coupling part in order to engage these coupling parts in sealing relation to lock axially together and define a fluid flow path passing through the coupling valve apparatus, and upon relative rotation of the coupling parts to open and regulate fluid flow in the flow path, said method including steps of:

providing each of the first and second coupling parts with a respective tubular body, using this tubular body to define cooperating means for axially engaging sealingly with the other of the first coupling part and second coupling part, providing means for locking the tubular bodies together in axial inter-engagement while allowing relative rotation of the coupling parts; providing a respective portion of a fluid flow path extending through both the coupling parts when engaged; and providing each of the tubular bodies with a respective valve seat through which the fluid flow path passes; providing a respective valve member rotational with and axially movable in the respective tubular body to engage the respective valve seat and close fluid communication in the respective portion of the flow path; providing each valve member with a respective camming surface confronting and engageable with the camming surface of the other of the respective valve members; and engaging the camming surfaces with one another and relatively rotating these engaged camming surfaces upon relative rotation of the coupling parts to axially unseat each valve member from its respective valve seat.

17. The method of providing a two-part coupling valve apparatus according to claim 16 further including the steps of providing the respective valve member with a valve member body, and providing the valve member body and the tubular body of the coupling part with cooperating means allowing relative axial motion of the valve member while being coupled to the tubular body for rotation therewith.

18. The method of providing a two-part coupling valve apparatus according to claim 17 further including the steps of providing the valve member body with a radially outwardly extending plurality of protrusions spaced circumferentially apart, using the protrusion to cooperatively define fluid flow channels therebetween, configuring each protrusion to define an axially extending groove, and providing the tubular body with a bore defining a portion of the flow path within the tubular body, forming a plurality of internally radially inwardly extending and axially extending ribs on this bore, and disposing the valve member in this bore with the grooves of the protrusions each receiving a rib of the body so that the valve member is axially slidable but is constrained against rotation relative to the tubular body.

19. The method of providing a two-part coupling valve apparatus according to claim 17 further including the steps of providing the valve member body with a nose section extending axially toward the other of said coupling parts when the coupling parts are inter-engaged, and using this nose section to define a camming surface which is confronting and engageable with a similar camming surface on the other of the respective valve members.

20. The method of providing a two-part coupling valve apparatus according to claim 19 further including the step of configuring the camming surface to be substantially wedge-shaped.

21. A coupling valve apparatus defining a fluid flow path passing therethrough and including a valve to controllably open, regulate, and close fluid flow in the flow path in response to rotation of the apparatus relative to a connector to which it is attached, said coupling valve apparatus comprising:

a tubular body defining a through flow path opening axially on an end of the tubular body, said tubular body having a stepped bore defining a portion of the flow path and including a reduced diameter section of the bore providing a valve seat disposed away from said end of the tubular body, and a larger diameter section of the bore adjacent to the valve seat;

a valve member disposed movably in the larger diameter bore section having a valving surface sealingly engageable with the valve seat;

said tubular body and said valve member defining cooperating means for allowing relative axial motion to seat and unseat the valve member from the valve seat while constraining the valve member against rotation relative to the tubular body;

resilient means for yieldably urging the valve member toward its seat;

said valve member including a nose section extending axially toward said end of the tubular body and a axially and circumferentially extending camming surface on said nose section confronting and engageable with a similar camming surface on the other connector upon rotation of the tubular body and valve member relative to this other connector, thus to cam the valve member away from the valve seat.

22. The coupling valve apparatus according to claim 21 wherein said cooperating means for allowing relative axial motion of the valve member while constraining the valve member against rotation relative to the tubular body said valve member having a radially outwardly extending plurality of protrusions spaced circumferentially apart to define fluid flow channels therebetween, each protrusion defining an axially extending groove, and the tubular body on said larger diameter section of the bore defining a plurality of internal radially inwardly and axially extending ribs, said valve member being movably received axially in said larger diameter bore section with each rib being received slidably in one of the grooves of the valve member.

23. The coupling valve apparatus according to claim 21 wherein said tubular body defines one of a matching cylindrical boss and cylindrical recess circumscribing said flow path.

24. The coupling valve apparatus according to claim 23 wherein said tubular body defines a cylindrical boss having an end surface disposed toward said end of the tubular body, and said cylindrical boss carries a sealing member circumscribing said boss, said tubular body further defining a sleeve portion surrounding this cylindrical boss and extending axially toward said end of the tubular body beyond said end surface of the cylindrical boss to radially outwardly shield the end surface of the cylindrical boss.

25. The coupling valve apparatus according to claim 23 wherein said tubular body defines a cylindrical recess, and said tubular body outwardly carries means for axially and relatively rotationally inter-engaging the connector.

* * * * *